United States Patent Office 2,779,506
Patented Jan. 29, 1957

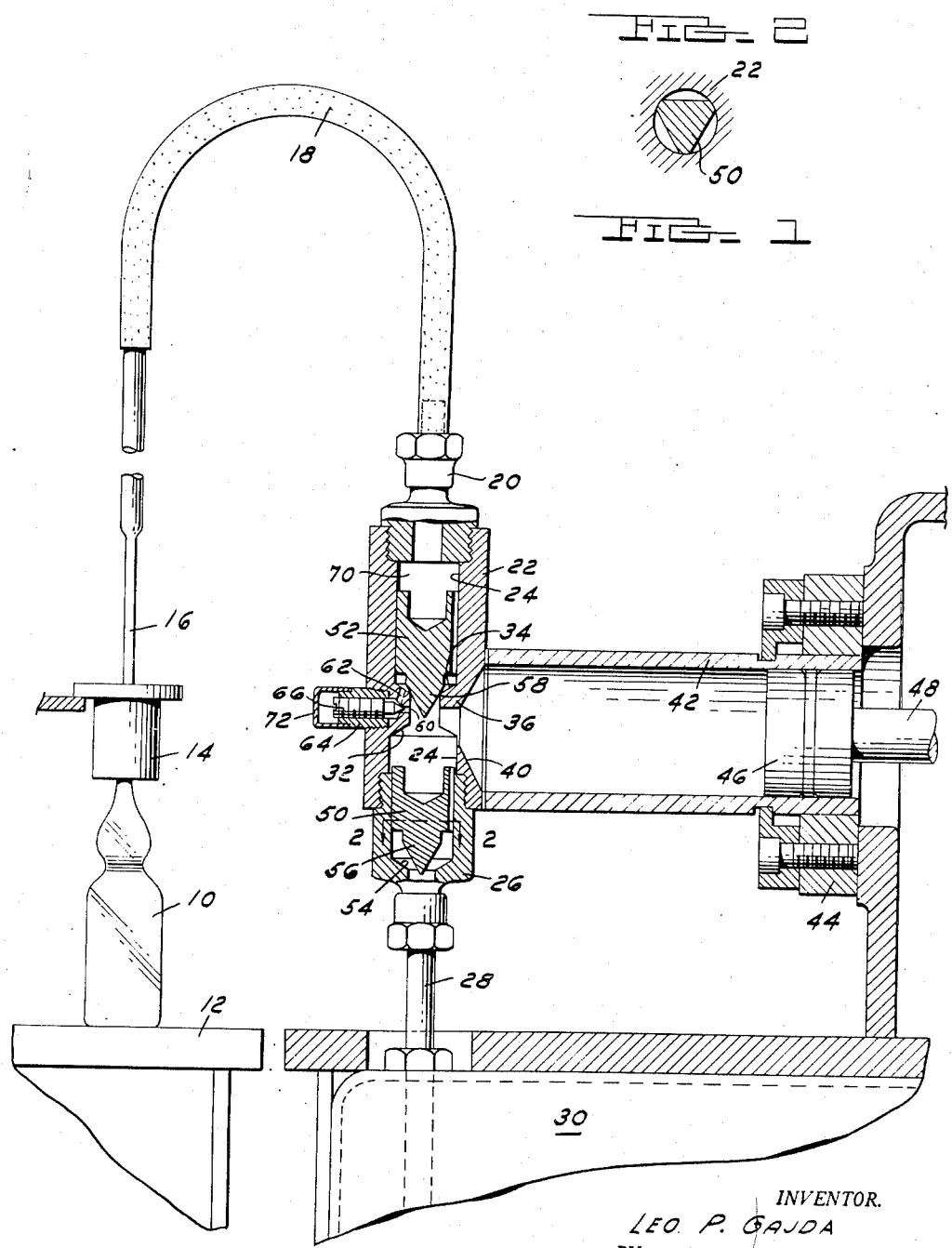

2,779,506

AMPOULE FILLING APPARATUS

Leo P. Gajda, Detroit, Mich., assignor to Arthur Colton Company, Detroit, Mich., a corporation of Michigan Application October 11, 1955, Serial No. 539,739

3 Claims. (Cl. 222—108)

This invention relates to a filling apparatus which is especially used in the pharmaceutical industry for dispensing liquids used for injections and other medical purposes.

It is an object of the invention to provide a dispensing mechanism which will prevent the loss of the liquid being metered and which will also prevent dripping of the material, which would contaminate the machine. Various methods may be used to handle the bottles or ampoules which are being filled, and suitable automatic machinery may be utilized with the portion of the apparatus which is to be disclosed here.

Briefly, the present invention relates to the control valve which receives liquid from a supply tank and which discharges liquid to a container to be filled. It is an object to provide in the valve housing a means for connecting to the filling conduit the reduced pressure utilized in filling the valve, thus preventing dripping.

Drawings accompany the disclosure, and the various views thereof may be briefly described as:

Figure 1, an assembly of the apparatus mostly in cross section showing the relationship of the various parts thereof.

Figure 2, a sectional view on line 2—2 of Figure 1.

In the drawings, an ampoule or bottle 10 to be filled is shown on a plate 12 which may be either a portion of a rotating table or a moving conveyor. If desired, a centering block 14 may be used for the ampoule; and a delivery needle 16 is connected to a hose 18 which leads to a nipple 20 connected to valve housing 22. The valve housing 22 has a cylindrical bore 24 which opens at the other end to a nipple 26 connected to a conduit 28 leading to a supply tank 30 for material to be dispensed. At the central portion of the valve housing are two valve seats 32 and 34 disposed on opposite sides of a restriction 36. The bore 24 is connected through a side opening 40 with a cylinder 42 which is positioned in sealed relationship to housing 22. The cylinder 42 is mounted on a suitable bracket 44; and within the cylinder is a piston 46 actuated by a rod 48 connected to a suitable cam or other actuating mechanism, not shown.

Within the valve housing are valves 50 and 52 at the bottom and top, respectively. At the bottom of the housing a seat 54 co-operates with a conical point 56 on valve 50, the valve being triangulated above this portion as shown in sectional view in Figure 2. Similarly, valve 52 has a triangular configuration with circumferential portions which ride on the walls of the bore 24 and a conical portion 58 which co-operates with valve seat 34.

In the restriction 36 opposite the opening 40, a small radial hole 60 connects with an axial hole 62 leading to the chamber above valve seat 34. A small adapter 64 is threaded into an opening in the wall of the valve housing 22 adjacent these passages and threaded in the adapter is a needle valve 66 having an end portion to restrict the passage 60 as it meets the passage 62. Adjustment of the valve 66 in the adapter 64 will regulate the effective area of the passages 60 and 62 leading to the upper valve chamber 70.

In the operation of the device, when the piston 46 is retracted as shown, material will be drawn from tank 30 past valve 50 to the cylinder 42. Upon a forward thrust of the piston 46, this material will cause lifting and opening of valve 62; and the material will flow around valve 52 into the conduit 18 and through the delivery needle 16 to the bottle 10. When the piston is again reversed and moved to the left as viewed in the drawing, additional material will be drawn from the tank 30; and also, the reduced pressure created by the motion of the piston will be transmitted through passages 60 and 62 and past the end of valve 66 to the chamber 70 and the conduit 18. This will cause a suck-back action at the needle 16 and prevent dripping. This permits a fresh ampoule to be moved into place while the valve chamber is being filled; and then, upon reversal of the piston 46, another ampoule or bottle 10 may be filled.

With the arrangement of the system as shown, it is clear that the passages 60 and 62 will be flushed upon each action of the device and there can be no stagnation in these passages. Furthermore, the device can be cleaned readily by the removal of the valve 66 and even the adapter 64. A small cap 72 is utilized to prevent tampering or inadvertent adjustment of valve 66.

I claim:

1. In a device of the type used for filling ampoules and bottles in measured quantity having a valve for alternately receiving and discharging material, a housing body having an ingress chamber adapted to be connected at one end to a source of material, a discharge chamber adapted to be connected at one end to a discharge conduit, a unidirectional valve in each of said chambers to permit flow into one and out of the other selectively and respectively, means forming a connecting passage between said chambers of smaller area than said chambers, said means forming a seat for the valve in said discharge chamber, a pressure developing and reducing device hydraulically associated with said passage between said chambers, a port opening formed in said housing connecting said passageway and said discharge chamber, means in said housing movable to control the effective flow area of said port opening, whereby a reduction in pressure in said passage and said ingress chamber will be accompanied by a simultaneous and controlled reduction in pressure in said discharge chamber.

2. In a device of the type used for filling ampoules and bottles in measured quantity having a valve for alternately receiving and discharging material, a housing body having a bore at each end separated by a restricted annular portion opening at one portion of the circumference to a pressure developing and reducing device, a seat formed on one side of said restricted portion, a valve in one end of said bore co-operating with said seat, a connection at said end of said bore for a discharge conduit, means at the other end of said bore for closing the same and connecting the bore to a source of material, a valve seat formed in said means co-operating with a second valve in said bore on the opposite side of the restricted portion from the first valve, and means connecting that portion of the bore in which the second valve is located connecting also the opening in said valve at the restricted portion to that portion of the bore in which the first valve is located through the walls of said bore, means on said body shiftable to control the effective flow area of said connecting means whereby reduction in pressure in said bore in the area of the second valve will be transmitted in limited degree to that portion of the bore adjacent the first first valve.

3. A device as defined in claim 2 in which means at the end of the bore adapted to be connected to a discharge conduit serves as a stop for the first valve, and the restricted means in said housing between said valve serves as a stop for the second valve, said valves having a cross sectional configuration varying from that of the bore to permit material to pass said valves when not seated.

No references cited.